Patented Dec. 17, 1940

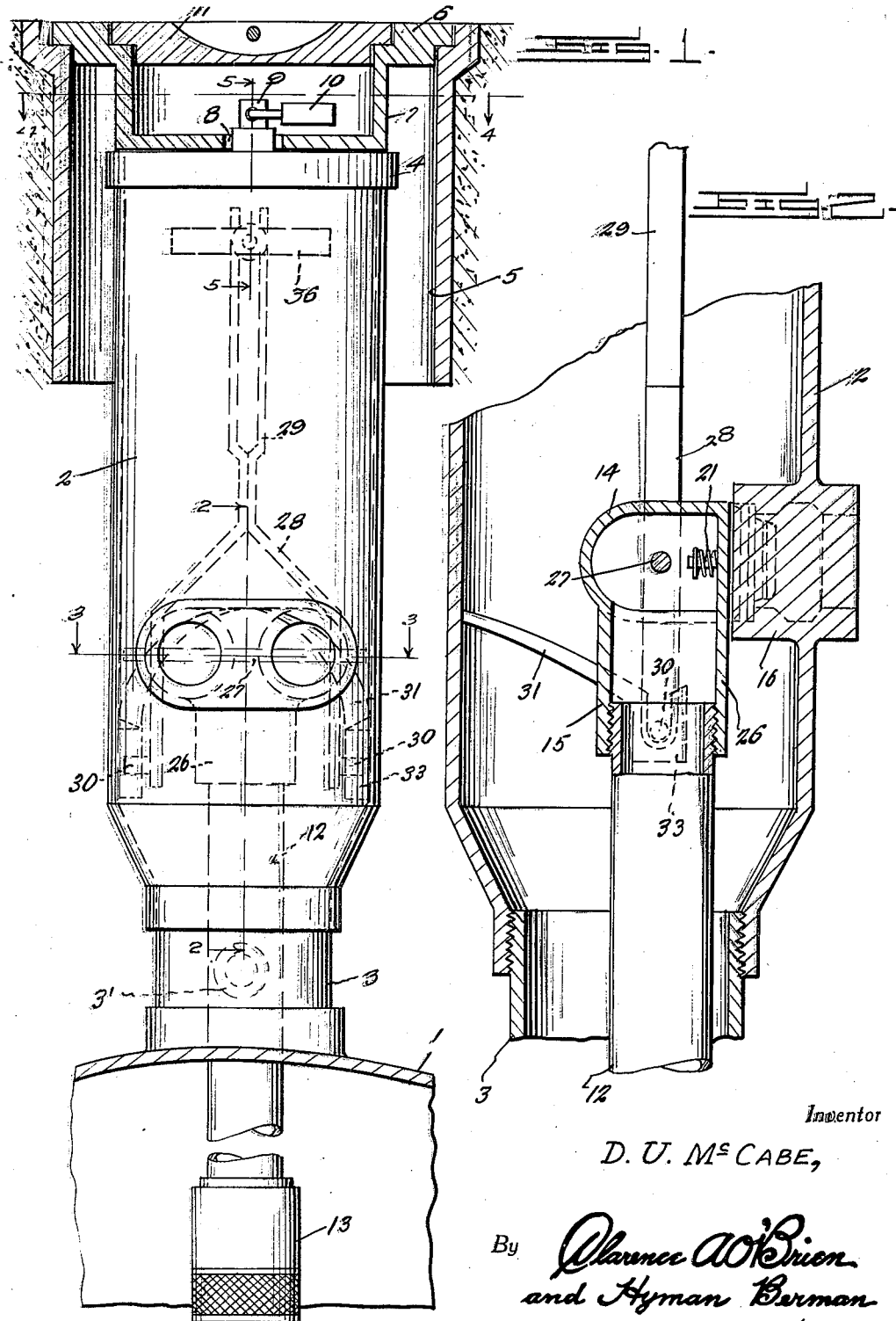

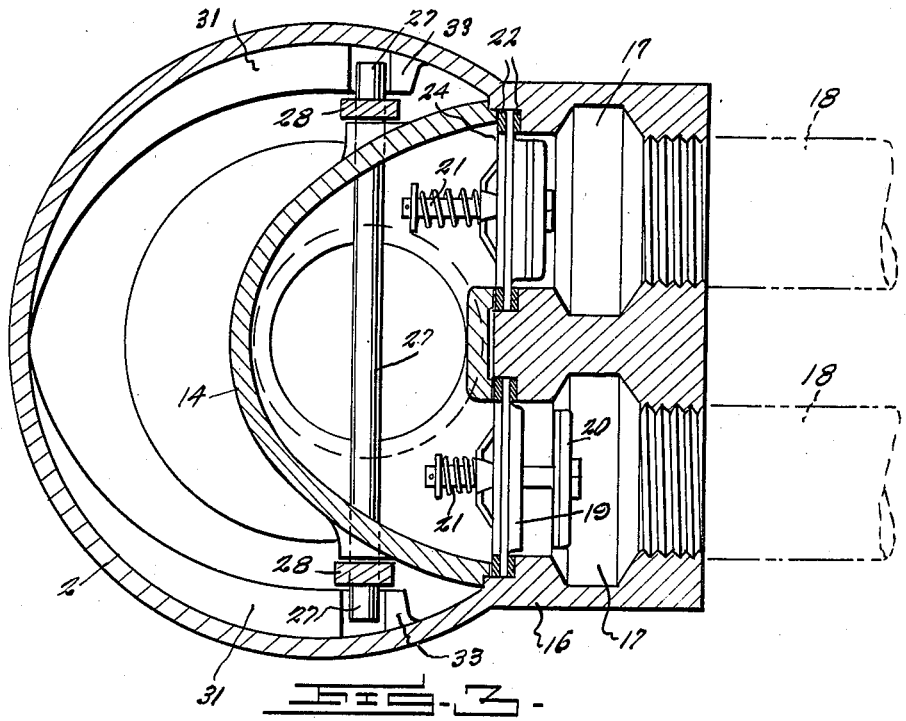
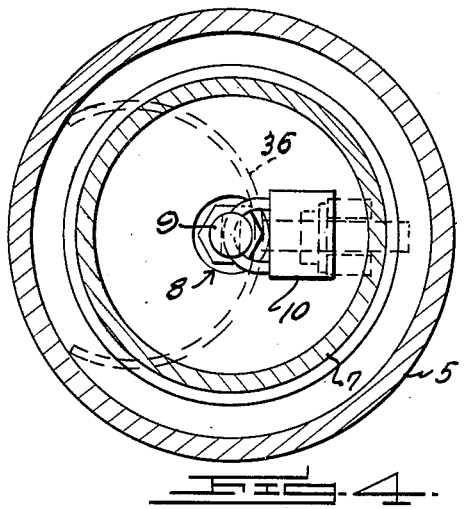

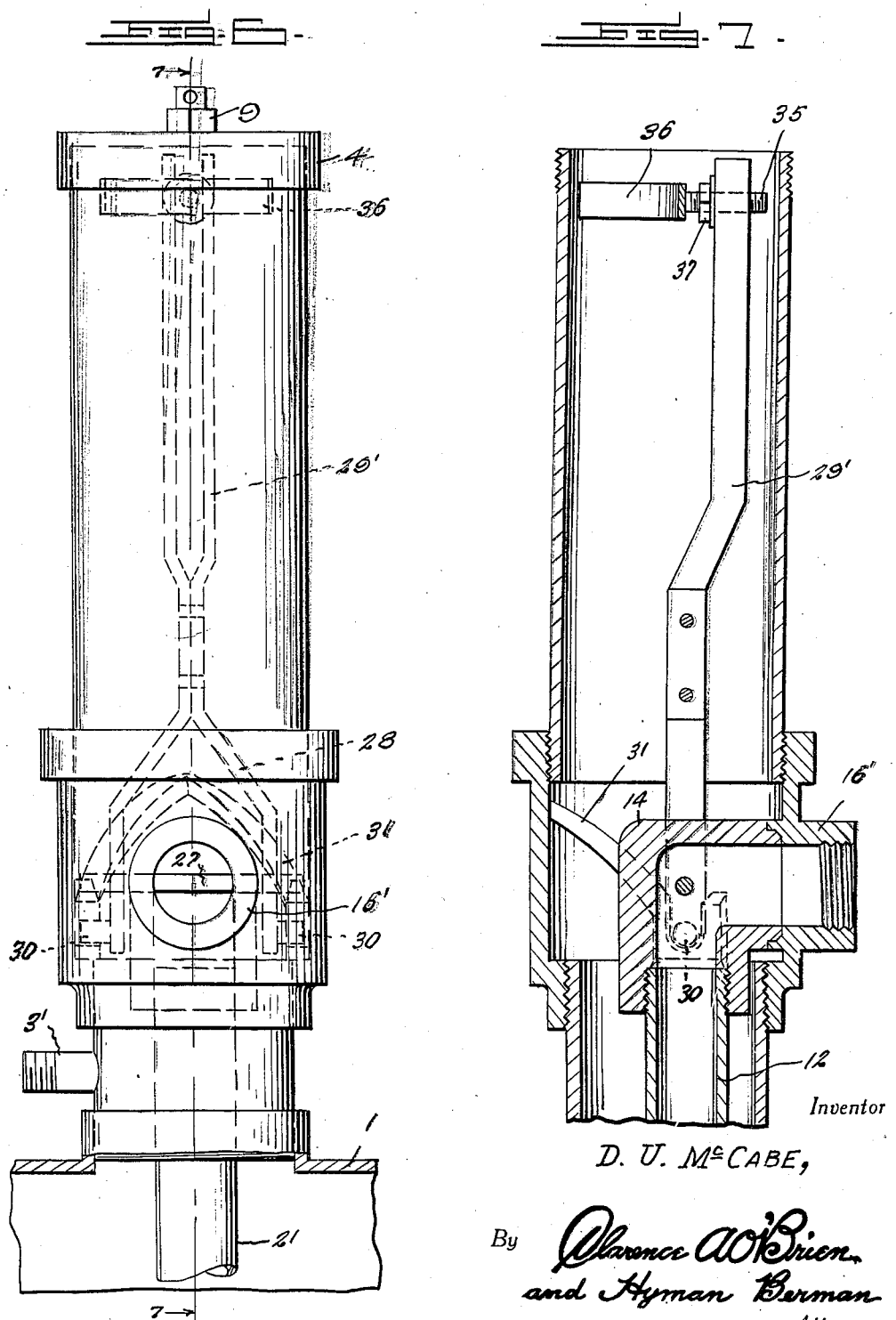

2,225,275

UNITED STATES PATENT OFFICE 2,225,275

VALVE EXTRACTING MEANS FOR UNDERGROUND STORAGE TANKS

Daniel U. McCabe, Athens, Tex., assignor of one-half to J. Marcus Wood, Longview, Tex.

Application December 1, 1939, Serial No. 307,159

3 Claims. (Cl. 285—22)

This invention relates to means for facilitating the removal and replacing of valve means of an underground storage tank so that the parts can be inspected and repaired very easily and without digging up the tank and with means for holding the parts in liquid-tight engagement while they are in operative position.

This invention also consists in certain other features of construction and in the combination and arrangement of the several parts to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:

Figure 1 is a view partly in section and partly in elevation showing a tubular connection between an underground tank and a manhole cylinder with the invention applied thereto.

Figure 2 is a section on the line 2—2 of Figure 1.

Figure 3 is a section on the line 3—3 of Figure 1.

Figure 4 is a section on the line 4—4 of Figure 1.

Figure 5 is a section on the line 5—5 of Figure 1.

Figure 6 is an elevational view somewhat similar to Figure 1 but showing a modification.

Figure 7 is a section on the line 7—7 of Figure 6.

In these drawings the numeral 1 indicates a portion of an underground tank, such as used for gasoline and the numeral 2 indicates an elongated vertically arranged tubular member which has its lower end reduced and connected by a tubular coupling 3 with the top of the tank. At the upper end the member 2 is provided with a cap 4 which is threaded thereto and this upper end of the member 2 fits in a manhole cylinder 5, the top of which is closed by a cap 6 which is formed with a cylindrical part 7 the bottom of which has a hole 8 therein for receiving the stud 9 on the top of the cap 7, this stud having a hole therein for receiving a locking bolt 10 so that the cap 7 cannot be removed by unauthorized persons, it being necessary to remove the lock 10 before the cap 6 can be removed, so as to expose the cap 7. The cap 6 is closed by a cover plate 11.

A vertically arranged tube 12 extends from a point adjacent the bottom of the tank 1 into the lower part of the tubular member 2 and has at its lower end the usual foot valve 13. A casing 14 has a depending tubular part 15 into which the upper end of the pipe or tube 12 is threaded. The member 2 at one side is formed with a flat laterally extending part 16 which has the openings 17 therein, the outer ends of which are threaded to receive the pipes 18 which lead to the service pumps. A valve arrangement shown generally at 19 is located in the inner end of each opening 17 the valve 20 of which is closed inwardly by the action of the spring 21, suitable gaskets 22 being provided for the plates or spiders which carry the valve means. The casing 14 at one side thereof is formed with the lateral openings 24 for registering with the inner ends of the openings 17 and this side is practically flat and vertical as shown at 26 to bear against the inner portion of the flat part 16 and portions of the casing 14 around the openings 24 therein bear against the gaskets to form a tight joint between the casing 14 and the part 16 when pressure is applied to the casing 14.

A pin 27 passes through the casing 14 and its ends pass through holes in the yoke-shaped lower end 28 of a lever 29, the lower ends of the limbs of the yoke having the outwardly extending trunnions or pins 30 thereon which engage the sloping shoulders 31 formed on interior walls of the member 2, these shoulders being formed by thickened parts of the member 2 and they slope from one point toward the part 16 and they terminate in vertically arranged hook-shaped portions 33 which are located one at each side of the part 15 of the casing 14 when said casing 14 is in position.

Thus by moving the lever 29 with the casing 14 suspended on the pin 27 downwardly into the part 2 its pins or trunnions 30 will strike the sloping shoulders 31 and these shoulders will direct the pins downwardly and forwardly until they engage the spaces formed by the hooks 33 and this will place the casing 14 close to the part 16. Then by swinging the top of the lever to the right in Figure 2 the casing 14 will be forced tightly against the gaskets 22 at the inner end of the member 16.

The upper end of the lever 29 is held in the position shown by having a threaded shank 35 formed on a ring-shaped part 36 passed between the forked upper end of the lever with the nut 37 on the shank 35 for forcing the upper end of the lever to the right or toward that side of the member 2 which carries the part 16. When this is done the ring member 36 which is of split and spring construction will engage a portion of the member 2, as shown in dotted lines in Figure 4 so that the lever 29 is held in position exerting pressure on the casing 14 to hold the same in liquid-tight contact with the part 16.

By having this member 36 of the shape shown a gauge stick can be passed through the parts into the tank and a tank wagon hose can also be inserted through the member 36 to fill the tank.

As will be understood the arrangement shown in Figures 1 to 5 enables two pumps to be connected with the storage tank by a single foot valve and the valve arrangement shown at 19 will enable one pump to be used while the gasoline is held in the line leading to the other pump and when it is desired to inspect or repair the valve the nut 37 is loosened on the shank 35 and then the lever 29 is moved to the left in Figure 2 and this pulls the casing 14 from the part 16 and then the lever is raised which will raise the casing 14 and the tube 12 and the foot valve and the valve assemblies 19 are exposed and can be reached through the member 2 when caps 7 and 6 are removed.

Figures 6 and 7 show an arrangement substantially similar to that before described excepting that the member 16' has a single opening therein for receiving a supply line for a single pump and, of course, the casing 14' is made in the form of an elbow with a single passage therethrough for connecting the pipe 12 having the foot valve at its bottom with the nipple or member 16' when the lever 29' is moved to the right in Figure 7. In other respects this form of the invention is similar to that before described.

A nipple 3' may be connected with the coupling 3 so that a supply pipe can be connected with the coupling.

It is thought from the foregoing description that the advantages and novel features of the invention will be readily apparent.

It is to be understood that changes may be made in the construction and in the combination and arrangement of the several parts provided that such changes fall within the scope of the appended claims.

Having described the invention, what is claimed as new is:

1. In a device of the class described, a tubular member having a part provided with outlet means, a casing within the tubular member having a flat part for engaging the inner end of the first-mentioned part, a fulcrum lever pivotally connected with the casing, a fulcrum forming part in the tubular member below the casing for receiving a lower part of the lever guiding means for engaging a part of the fulcrum lever for guiding the same to the fulcrum forming part of the tubular member and to a point where the casing is engaged with the first-mentioned part, and adjustable means connected with the upper end of the lever and engaging an upper part of the tubular member for holding the lever in position with the casing pressed tightly against the first-mentioned part.

2. In a device of the class described, a tubular member having a thickened part provided with outlet means, a casing having a part for engaging the inner end of the thickened part, a fulcrum lever having a yoke at its lower end, a pin connecting the casing with the lever, recessed parts on the internal walls of the tubular member under the casing, pins on the forked part of the lever for engaging the recesses, guiding shoulders on the internal walls of the tubular part for guiding the pins of the lever into the recesses and means at the upper end of the lever for holding the same in position with the casing pressed tightly against the inner end of the thickened part.

3. In a device of the class described, a tubular member having a thickened part provided with outlet means, a casing having a part for engaging the inner end of the thickened part, a fulcrum lever having a yoke at its lower end, a pin connecting the casing with the lever, recessed parts on the internal walls of the tubular member under the casing, pins on the forked part of the lever for engaging the recesses, guiding shoulders on the internal walls of the tubular part for guiding the pins of the lever into the recesses and means at the upper end of the lever for holding the same in position with the casing pressed tightly against the inner end of the thickened part, such means including a split ring-shaped member having a threaded shank thereon passing through an opening in the upper end of the lever and a nut on the threaded shank for holding the upper end of the lever in adjusted position with a part of the ring-shaped member engaging an opposite wall of the tubular part.

DANIEL U. McCABE.